March 24, 1953     E. F. PIWCZYNSKI ET AL     2,632,669
GLARE FILTER
Filed Aug. 14, 1946
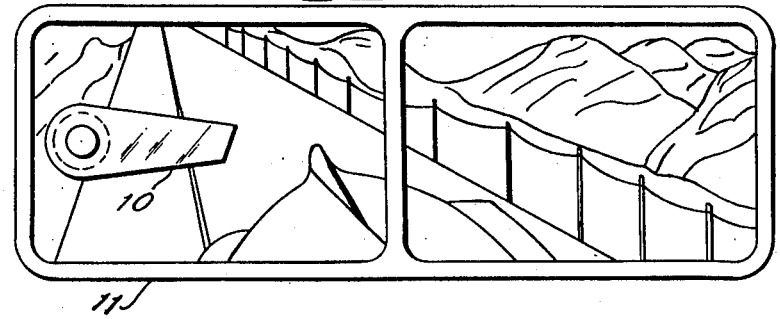
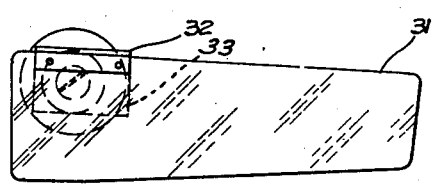
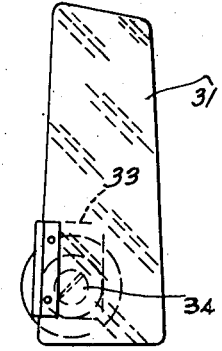
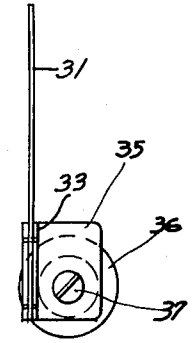
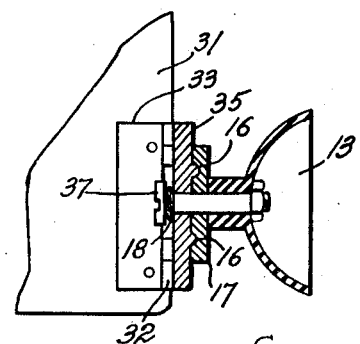
INVENTORS Patented Mar. 24, 1953

2,632,669

UNITED STATES PATENT OFFICE 2,632,669

GLARE FILTER

Edward F. Piwczynski and Roman Galinski,
New Britain, Conn.

Application August 14, 1946, Serial No. 690,366

1 Claim. (Cl. 296—97)

Our invention relates to improvements in glare filters of the form that is used to protect the eyes of the driver of an automobile against the effects of the glare of the lights of an approaching automobile and that is located under conditions of use within a restricted zone of vision of the driver leaving the major portion of scope of vision substantially unaffected, and the object of our improvement is to produce a glare filter that is useful and efficient under conditions of use and that under conditions in which such a device is not required or desired may be easily removed from such condition of use by means that are relatively simple and effective.

In the accompanying drawing:

Figure 1 is a front elevation of our improved glare filter, as viewed from the seat of the driver of the automobile who is to be protected against the glare from the lights of an approaching automobile.

Fig. 2 is a sectional view in part of the glare filter, showing details of the supporting means, including the rubber suction cup.

Fig. 3 is a front elevation of another modification in which the supporting means permit of successive movements for effecting retraction of the shield which is gripped essentially by an upper rear corner.

Fig. 4 shows the same swung away from the usual operating position shown in Fig. 3, and Fig. 5 shows the same in the fully retracted position in which the shield is viewed in a generally edgewise position.

Our improved glare filter comprises a shield proper 10, as shown in Fig. 1, that is located on the rear face of the windshield 11 of an automobile in a position so as to operate to intercept the rays of light coming from the headlights of an approaching automobile and thus to overcome and dim the dazzling effects thereof and to permit the driver to have substantially clear vision of the road ahead and enhance the safety of driving.

An important feature of our improved glare filter is that it is supported from one point or one end only, as shown in Fig. 1 from near the left end; being formed of material that is transparent so as to be adapted to filter the light rays to the proper extent needed for its intended purpose; yet not blotting out the view of the approaching car nor distorting the natural forms or colors in the scope of its coverage of the view; being in sheet form and having sufficient rigidity to remain extended to its full extent without support other than from adjacent the one supporting end. Supporting engagement with the rear face of the glass of the windshield is provided by a rubber suction cup 13, Fig. 2, to which the other parts of the structure are operatively connected in any proper manner.

Another important feature of our glare filter is in its being adjustable and retractable. It can be placed at the windshield in the most desirable and efficient position to suit individual requirements of comfort and physique. Once so adjusted it can be moved out of the way when not in use and similarly just as easily brought back in required position when so desired.

This characteristic feature of retractability of our glare filter is attained in the manner of attachment that permits retraction of the device when not in actual use thereby in no way affecting the conditions of normal driving. The methods of retracting may be any one of the following: pivoting on a swivel, turning, swinging, sliding, or a combination of any of these, such as for instance, swiveling and turning.

Our improved glare filter may be fastened to the windshield or any member of the windshield by means of rubber suction cups, or by other suitable means.

The drawings illustrate the use of rubber suction cups as means of attachment and at the same time different methods of retraction and these Figs. 1, 2, 3, 4 and 5 illustrate the swivel type of mounting.

Fig. 2 shows details of construction of the swivel type shield previously illustrated. The shield proper 10 is held in place between two washers 15 by means of rivets 16 which rest on a third washer 17 having a number of pockets corresponding to the heads of the rivets, thus permitting a secure hold of the shield in a desired position. Retaining nut 19 locks washer 17 to the suction cup 13 and at the same time exerts pressure on the assembly by means of tension spring 18.

Figs. 3, 4 and 5 illustrate a combination method of retraction by which the shield is retracted both by swiveling and turning. In Fig. 3 the shield proper 31 is supported in the upper left hand corner of the windshield by a hinge 32 one leaf 33 of which is secured to the shield and the other leaf 35 of which is pivotally connected to a suction cup 36 by a screw 37. Figs. 4 and 5 further illustrate the details of construction showing the shield in successive stages of retraction; in Fig. 4 the shield is swung upward on a pivot arrangement 34 similar to that shown in Fig. 2, and in Fig. 5 it assumes edgewise position by turning on the hinge 32. The entire assembly of the shield mounting means is similar to that shown and described in Fig. 2 excepting that hinge leaf 35 and screw 37 take the place of nut 19.

The object of this invention is to shield the eyes of the driver from the glare of approaching headlights yet not in any way to obstruct or distort his view of the road; to make this shield adjustable to individual requirements of comfort and physique, and to permit instant retraction of the device when not needed or desired; to promote comfort and safety in night driving by eliminating the hazard of temporary blindness caused by dazzling glare of oncoming headlights.

We claim as our invention:

A glare filter for motor vehicles, comprising a shield of transparent material having the property of eliminating headlight glare and means for mounting the shield on the motor vehicle for movement into and out of an operative position adjacent the windshield and in alignment with the glare rays traveling toward the operator of the vehicle from vehicles approaching in the opposite direction, the area of the shield being so small that it intercepts substantially only the glare rays from the approaching vehicles, the shield being of irregular shape and relatively thin and having its greatest dimension extending approximately horizontally at the upper edge of the shield when it is in operative position, the upper edge of the shield extending in a straight line from one end portion to the other, the shield having a gradually diminishing width from one end portion toward the other end of the shield which is nearer the longitudinal axis of the vehicle, said other end of the shield being of substantial width with its edge inclined in one direction to the vertical and with the upper edge of the shield projecting beyond the lower edge, the mounting means for the shield including a suction cup, a pivot connected to the cup, and a hinge having one leaf part connected to the pivot and the other leaf attached to the shield, the axis of the pivot being disposed approximately horizontally when mounted on the vehicle, and the axis of the hinge being disposed at right angles to the axis of the pivot, the pivot having a stationary part and a cooperating movable part, said parts having spaced apart interfitting projections and depressions, and spring means for urging said parts together, the arrangement being such that the shield can be moved from operative position wherein it shields headlight glare and wherein the projections extend into the depressions and can readily be returned to said operative position.

EDWARD F. PIWCZYNSKI.
ROMAN GALINSKI.

REFERENCES CITED

The following references are of record in the file of this patent:

UNITED STATES PATENTS

| Number | Name | Date |
|---|---|---|
| 1,097,295 | Brown et al. | May 19, 1914 |
| 1,286,352 | Kubat | Dec. 3, 1918 |
| 1,483,640 | Manning | Feb. 12, 1924 |
| 1,591,739 | Blake | July 6, 1926 |
| 1,606,853 | Trisler | Nov. 16, 1926 |
| 1,849,338 | Stansberry | Mar. 15, 1932 |
| 1,920,185 | Carr | Aug. 1, 1933 |
| 2,050,889 | Klise | Aug. 11, 1936 |
| 2,207,668 | Hudgings, Jr. | July 9, 1940 |
| 2,220,429 | Soderberg | Nov. 5, 1940 |
| 2,236,710 | Hocking | Apr. 1, 1941 |
| 2,261,881 | Horstmann | Nov. 4, 1941 |

FOREIGN PATENTS

| Number | Country | Date |
|---|---|---|
| 23,556 | Australia | Nov. 12, 1929 |